(12) United States Patent
Kapturowski et al.

(10) Patent No.: US 7,607,649 B2
(45) Date of Patent: Oct. 27, 2009

(54) APPARATUSES AND METHODS FOR STAGING AND PROCESSING DOCUMENTS FOR SHEET PROCESSING

(75) Inventors: Edward J. Kapturowski, Apex, NC (US); Richard D. Johnson, Fuquay-Varina, NC (US)

(73) Assignee: Bowe Bell + Howell Company, Durham, NC (US)

( * ) Notice: Subject to any disclaimer, the term of this patent is extended or adjusted under 35 U.S.C. 154(b) by 397 days.

(21) Appl. No.: 11/546,554

(22) Filed: Oct. 12, 2006

(65) Prior Publication Data
US 2007/0145659 A1 Jun. 28, 2007

Related U.S. Application Data

(63) Continuation-in-part of application No. 11/240,604, filed on Oct. 3, 2005, now Pat. No. 7,396,006.

(51) Int. Cl.
*B65H 39/00* (2006.01)
(52) U.S. Cl. ............... 270/52.16; 270/52.14; 270/52.19
(58) Field of Classification Search ............. 270/52.01, 270/52.14, 52.16, 52.19; 53/447, 540
See application file for complete search history.

(56) References Cited

U.S. PATENT DOCUMENTS

| | | | | |
|---|---|---|---|---|
| 3,207,017 | A | * | 9/1965 | Mccain ............... 83/27 |
| 3,275,118 | A | * | 9/1966 | Mccain et al. ............ 198/644 |
| 3,545,371 | A | | 12/1970 | Reist |
| 3,717,074 | A | | 2/1973 | Rasmussen |
| 4,071,997 | A | | 2/1978 | Gunther, Jr. et al. |
| 4,078,790 | A | | 3/1978 | Stocker |
| 4,217,085 | A | | 8/1980 | Ljungberg et al. |
| 4,299,073 | A | | 11/1981 | Golicz et al. |
| 4,524,691 | A | | 6/1985 | Miller |
| 4,541,764 | A | | 9/1985 | Govan et al. |
| 4,604,849 | A | | 8/1986 | Zemke et al. |
| 4,694,631 | A | | 9/1987 | Gunther, Jr. |
| 4,694,632 | A | | 9/1987 | Gunther, Jr. |
| 4,753,429 | A | | 6/1988 | Irvine et al. |
| 4,775,143 | A | | 10/1988 | Arnoldi et al. |

(Continued)

FOREIGN PATENT DOCUMENTS

DE 3409168 9/1985

(Continued)

OTHER PUBLICATIONS

Extended European Search Report for EP07017894 dated Feb. 28, 2008.

(Continued)

*Primary Examiner*—Gene Crawford
*Assistant Examiner*—Leslie A Nicholson, III
(74) *Attorney, Agent, or Firm*—Jenkins, Wilson, Taylor & Hunt, P.A.

(57) ABSTRACT

Apparatuses and methods are provided for staging and processing documents including sheet articles, particularly for processing of sheet articles for mail processing. Different sets of pusher members for advancing document sets along a conveying path are used within the sheet processing machine. The action of the different sets of pusher members within the staging station permits a larger window and location to feed document sets into the staging station to increase processing efficiency.

19 Claims, 11 Drawing Sheets

U.S. PATENT DOCUMENTS

| | | | |
|---|---|---|---|
| 4,787,192 | A | 11/1988 | Gunther, Jr. |
| 4,958,063 | A | 9/1990 | Hausmann |
| 5,100,125 | A | 3/1992 | Uplinger et al. |
| 5,125,214 | A | 6/1992 | Orsinger et al. |
| 5,154,410 | A | 10/1992 | Baader et al. |
| 5,230,504 | A | 7/1993 | Schmaling |
| 5,255,498 | A | 10/1993 | Hotchkiss et al. |
| 5,414,977 | A | 5/1995 | Cohen |
| 5,415,068 | A | 5/1995 | Marzullo |
| 5,417,414 | A | 5/1995 | Belec et al. |
| 5,449,159 | A | 9/1995 | Belec et al. |
| 5,524,417 | A | 6/1996 | Iddon |
| 5,581,972 | A | 12/1996 | Antonelli |
| 5,737,899 | A | 4/1998 | Supron et al. |
| 5,802,808 | A | 9/1998 | Lyga |
| 5,848,518 | A | 12/1998 | Bufalini et al. |
| 5,860,643 | A | 1/1999 | Moser et al. |
| 6,041,569 | A | 3/2000 | Freeman et al. |
| 6,182,962 | B1 | 2/2001 | Leuthold |
| 6,341,773 | B1 | 1/2002 | Aprato et al. |
| 6,371,902 | B1 | 4/2002 | Bluemle |
| 6,398,204 | B1 | 6/2002 | Keane et al. |
| 6,446,955 | B1 | 9/2002 | Janatka et al. |
| 6,615,105 | B2 | 9/2003 | Masotta |
| 6,915,184 | B2 | 7/2005 | Yates et al. |
| 6,957,521 | B2 | 10/2005 | Botschek et al. |
| 7,021,184 | B2 | 4/2006 | Sussmeier et al. |
| 7,220,093 | B2 | 5/2007 | Overman et al. |
| 7,396,006 | B2 | 7/2008 | Kapturowski et al. |
| 2003/0014376 | A1 | 1/2003 | DeWitt et al. |
| 2004/0035527 | A1 | 2/2004 | Cook |
| 2004/0255561 | A1 | 12/2004 | Heilman |
| 2005/0189409 | A1 | 9/2005 | Conrad et al. |
| 2007/0075475 | A1 | 4/2007 | Kapturowski et al. |
| 2007/0164496 | A1 | 7/2007 | Kapturowski et al. |
| 2008/0086983 | A1 | 4/2008 | Kapturowski et al. |
| 2008/0088076 | A1 | 4/2008 | Shinn et al. |
| 2008/0088083 | A1 | 4/2008 | Kapturowski et al. |
| 2008/0090713 | A1 | 4/2008 | Kapturowski et al. |

FOREIGN PATENT DOCUMENTS

| | | | |
|---|---|---|---|
| DE | 3811221 | A1 | 10/1989 |
| DE | 3938530 | | 8/1990 |
| DE | 19543634 | | 5/1997 |
| DE | 10208583 | A1 | 10/2002 |
| DE | 203 20 537 | | 10/2004 |
| EP | 0 113 011 | | 7/1984 |
| EP | 0220124 | | 4/1987 |
| EP | 1 770 042 | A2 | 4/2007 |
| EP | 1770042 | | 4/2007 |
| EP | 17700042 | | 4/2007 |
| EP | 1911602 | | 4/2008 |
| EP | 1911703 | | 4/2008 |
| EP | 1911704 | | 4/2008 |
| EP | 1911708 | | 4/2008 |
| EP | 1911710 | | 4/2008 |
| FR | 2 587 015 | A1 | 3/1987 |
| GB | 2347897 | | 9/2000 |
| GB | 2399056 | | 9/2004 |
| JP | 61295934 | | 12/1986 |
| JP | 08207177 | | 8/1996 |
| WO | WO98/46420 | | 10/1998 |
| WO | WO01/56712 | | 8/2001 |

OTHER PUBLICATIONS

Extended European Search Report dated Jan. 31, 2008 for EP 07020043.1-2211.
Partial European Search Report for EP07017898 dated Feb. 13, 2008.
Office Action-non final action dated Jun. 18, 2008 for U.S. Appl. No. 11/546,552.
Office Action Restriction Requirement dated Oct. 30, 2007 for U.S. Appl. No. 11/546,556.
Office Action-non final action dated Jan. 10, 2008 for U.S. Appl. No. 11/546,556.
Notice of Allowance dated Jul. 14, 2008 for U.S. Appl. No. 11/546,556.
Office Action-non final action dated Sep. 25, 2007 for U.S. Appl. No. 11/240,604.
Notice of Allowance dated Dec. 11, 2007 for U.S. Appl. No. 11/240,604.
Patent Withdrawal Notice dated Mar. 28, 2008 for U.S. Appl. No. 11/240,604.
Notice of Allowance dated Apr. 24, 2008 for U.S. Appl. No. 11/240,604.
European Search Report for Corresponding Application EP 06 01 8903 dated Mar. 13, 2007.
Extended European Search Report issued in European Patent Application No. EP 07 01 7896, dated Feb. 22, 2008.

* cited by examiner

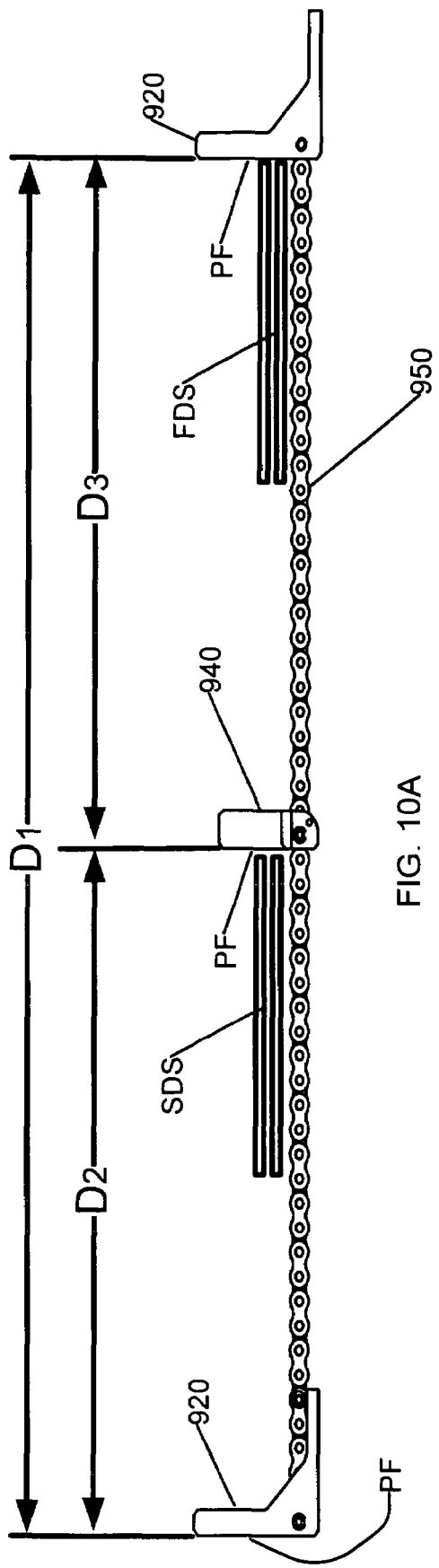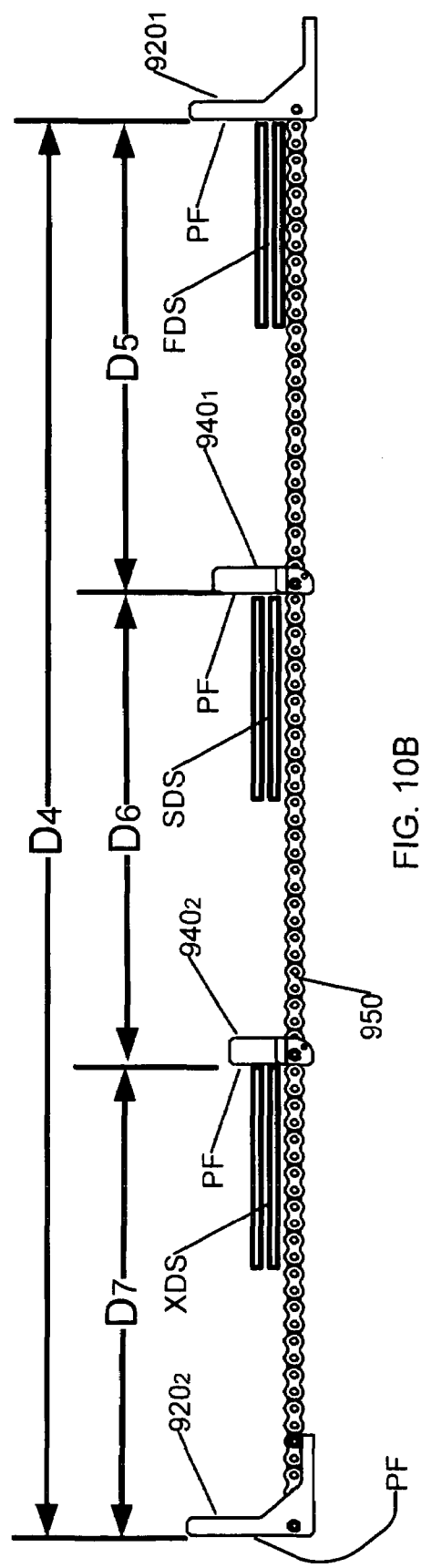

APPARATUSES AND METHODS FOR STAGING AND PROCESSING DOCUMENTS FOR SHEET PROCESSING

RELATED APPLICATIONS

This application is a continuation-in-part and claims benefit to U.S. patent application Ser. No. 11/240,604, filed Oct. 3, 2005, now U.S. Pat. No. 7,396,006 the disclosure of which is incorporated herein by reference in its entirety. Also, this application relates to U.S. patent application Ser. No. 11/546,535, entitled "INSERTER SYSTEMS AND METHODS" filed simultaneously, the disclosure of which is incorporated herein by reference in its entirety.

TECHNICAL FIELD

The subject matter disclosed herein relates generally to processing of sheet articles. More particularly, the subject matter disclosed herein relates to apparatuses and methods for staging document sets for sheet processing.

BACKGROUND

Various processing machines and methods for sheet processing, particularly mail processing, have been employed in the past for receiving materials from a number of sources and collating the materials, or combining them into a single packet of material. The single packet is then ready for further processing. For example, in a mail inserter system, the single packet can then be inserted into an envelope at an envelope inserting station located downstream.

In known sheet processing machines, a prime document can be typically generated or fed and additional materials can be added to the prime document as it traverses the processing machine. Typically, the packet comprises a single stack of documents, wherein the order of the documents in the stack is predetermined by the process flow of the processing machine.

Known track systems can feed documents from a series of feed stations in a synchronized manner so that a document from each feed station can be placed on top of a document from a preceding, up-stream feed station. A number of documents can be collated together to form a packet. For example, in a mail processing machine, a packet of documents can comprise one prime document, such as an address bearing document, and several attachments, such as leaflets or advertisements. The prime document can include the mailing address to which the package (e.g. envelope with packet inserted therein) is to be delivered. In such cases, collation must be performed so that when the documents are placed in a window envelope, the address will be visible through the window. This process can be accomplished by first feeding the prime document onto the track conveyor, face downwards, and adding the subsequent documents on top to form a packet which is then inserted into the envelope with the prime document facing downwards.

To improve speeds and efficiencies in sheet processing, known techniques can use a synchronous system that uses fixed pins or pusher structures of different heights and provide a method of transporting subsets of documents along a conveying path to be collated later. The fixed pins, comprising first tall pins and second short pins, alternate along a conveyor that moves them. With this system, a document which is to be placed on top of the packet must be transported by the first (shorter) set of pins in the synchronous transport. Due to the distance provided between each of the fixed pins and the speeds at which the machines run, the prime documents to be fed onto the conveying path have a short window of opportunity to be accurately and properly fed in front of the correct pin that is to push each prime document. If, for some reason, the timing of the feeding of the prime document is slightly off, the window of opportunity to feed the document may be missed. In such case, a misfeed can occur causing delays in processing. Alternatively, the feeding mechanism will have to wait until the next window of opportunity arises to feed the document in front of the correct fixed pin (short or tall) to push that document. Such waiting causes inefficiencies in processing.

In light of the above, needs exist for improved staging and processing of sheet articles, such as mailing articles particularly with regard to improving throughput and increasing efficiencies within a sheet processing machine.

SUMMARY

In accordance with this disclosure, novel apparatuses and methods are provided for staging and processing documents comprising sheet articles, particularly for processing of sheet articles for mail processing.

It is an object of the present disclosure therefore to provide novel apparatuses and methods providing a staging station with increased capacity for sheet processing. This and other objects as can become apparent from the present disclosure are achieved, at least in whole or in part, by the subject matter described herein.

BRIEF DESCRIPTION OF THE DRAWINGS

A full and enabling disclosure of the present subject matter including the best mode thereof to one of ordinary skill of the art is set forth more particularly in the remainder of the specification, including reference to the accompanying figures in which:

FIG. 10A illustrates a side view of an embodiment of the spacing of first pusher members and movable pusher members on a portion of a conveyor according to the present subject matter; and FIG. 10B illustrates a side view of a further embodiment of the spacing of first pusher members and movable pusher members on a portion of a conveyor according to the present subject matter.

DETAILED DESCRIPTION

Reference will now be made in detail to presently preferred embodiments of the present subject matter, one or more examples of which are shown in the figures. Each example is provided to explain the subject matter and not as a limitation. In fact, features illustrated or described as part of one embodiment can be used in another embodiment to yield still yet another embodiment. It is intended that the present subject matter covers such modifications and variations.

The term "sheet article" is used herein to designate any sheet article, and can include, for example and without limitation, envelopes, sheet inserts folded or unfolded for insertion into an envelope or folder, and any other sheet materials.

The term "mail article" is used herein to designate any article for possible insert into a mailing package, and can include, for example and without limitation, computer disks, compact disks, promotional items, or the like, as wells any sheet articles.

The term "document set" is used herein to designate one or more sheet articles and/or mail articles grouped together for processing.

As defined herein, the term "insert material" can be any material to be inserted into an envelope, and can include, for example and without limitation, one or more document sets, sheet articles, mail articles or combinations thereof.

Figure 1:
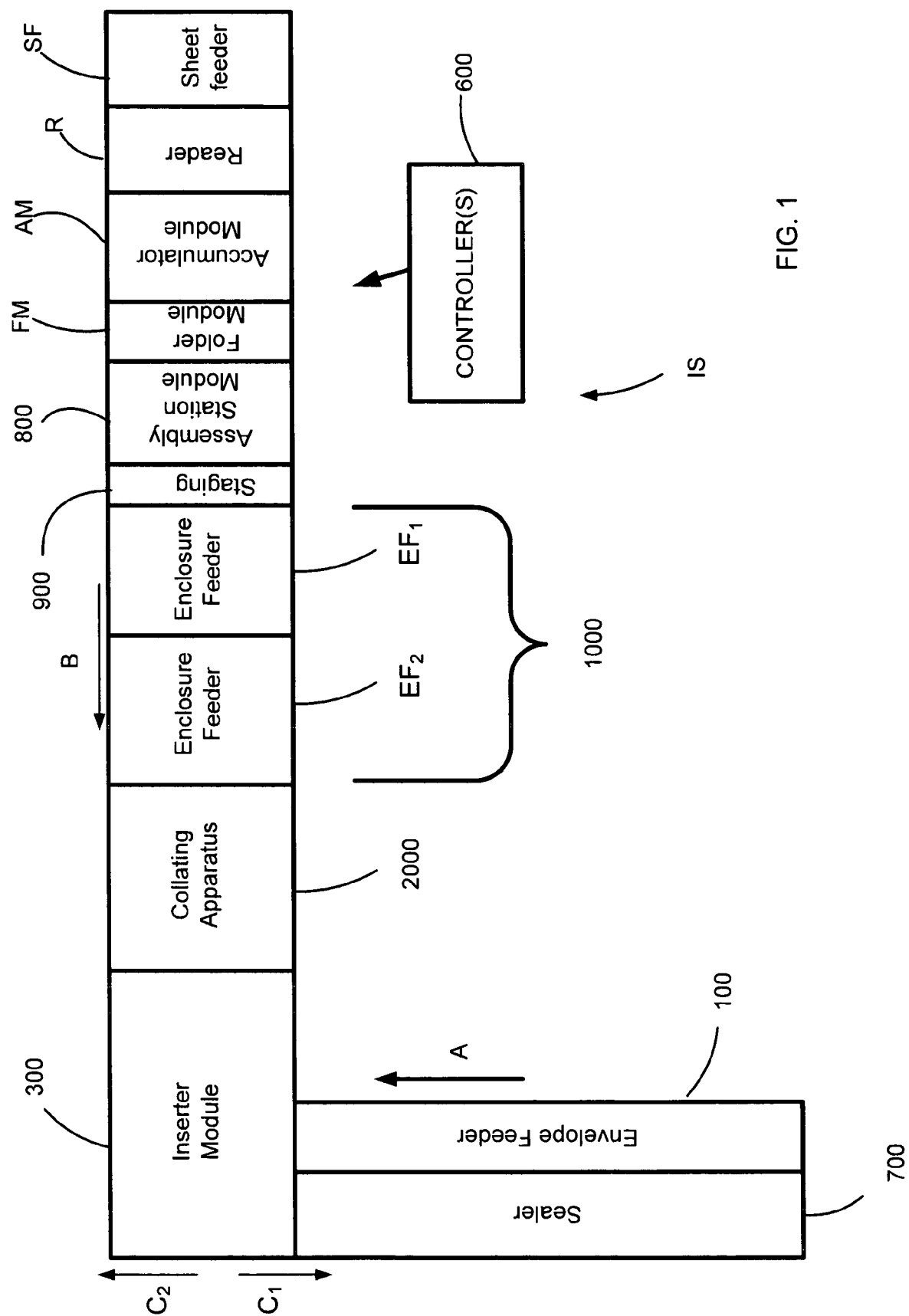
FIG. 1 illustrates a schematic view of an embodiment of an inserter system that can employ an embodiment of the present subject matter.

The present subject matter relates to sheet processing, such as, for example, mail inserting systems, mail sorting systems, and any other sheet processing systems. For example, FIG. 1 illustrates a plan schematic view of an inserter system, generally designated IS. The inserter system IS can comprise different modules that can be assembled in different arrangements for inserting material into envelopes. The different modules and inserter system IS can be controlled by a controller 600. The controller 600 can be computer hardware or software. For example, the controller can include one or more computers, a mini-computers, a programmable logic controllers or the like.

Inserter system IS can included, for example, an envelope feeder module, generally designated as 100, which feeds envelopes in a direction A into an inserting station module, generally designated as 300. An assembly station module 800 can be used to collect one or more sheet articles and/or one or more mail articles from upstream into a first document set that can be sent to a staging station 900 before being conveyed in a direction B toward inserting station module 300. In front of or behind each first document set on a conveying path of the inserter system IS, one or more sheet articles and/or mail articles can be fed on the conveying path to form second document sets as the first document sets move in the direction B so that each first document set and corresponding second document sets can be combined together into insert material for insertion into an envelope.

The second document sets are fed into the conveying path to be combined with the first document sets by one or more modules 1000 of enclosure feeders $EF_1$, $EF_2$. Each enclosure feeder module $EF_1$, $EF_2$ can include one or more station feeders for providing second document sets to be included in insert material to fill the envelope. Enclosure feeders $EF_1$, $EF_2$ can feed second document sets in front of the first document set or behind the first document set. Further, enclosure feeders $EF_1$, $EF_2$ can feed sheet articles and/or mail articles on top of the first document set or on to the collation track. The collation track runs from the staging station 900 through the collating apparatus 2000.

In the examples shown, a collating apparatus module 2000, as shown and described in U.S. patent application Ser. No. 11/240,604 can be provided to collate the first and second document sets together before being feed to the inserter module 300 where the material can then be placed into an envelope. Each filled envelope can then be directed in direction $C_1$ into a sealer module 700 after insertion has occurred. The envelopes can be sealed in the sealer module 700 before they are sent out for metering and mailing. Further, the inserter module can include an apparatus for diverting defects in a direction $C_2$ out of the inserter system IS.

Other modules can be included in the inserter system IS. For example, a sheet feeder SF for feeding in sheet articles to be collected in the assembly station 800 is normally positioned upstream of the assembly station 800. Assembly station 800 can be followed by staging station 900. Further, other modules can be placed inside the inserter system IS such as a folder module FM, accumulator module AM and reader module R as are commonly used within the art. These modules can be placed anywhere within inserter system IS where they may be needed for a desired use.

Reader module R can be used to read and collect information from sheets passing under it, for example, from bar codes. Reader module R can be in direct communication with controller 600. Reader module R can read information from sheet articles and/or mail articles to be used by controller 600 to control inserter system IS. The information read by reader module R can help determine how a grouping of sheet articles and/or mail articles in a document set will be processed within inserter system IS. Further, the information can be used to determine what other document sets may be needed in the insert material for any particular envelope. Accordingly, the information can also be used to determine the amount of insert material to be received in each envelope.

According to certain aspects of the present subject matter, a staging station for one or more document sets within a sheet processing machine is provided. The staging station can include a conveying path for conveying a plurality of document sets from an upstream position to a downstream position. A document feeder can be configured to feed a first document set to the conveying path. A stop location can be located along the conveying path wherein the first document set can reside after the document feeder feeds the first document set to the conveying path. The staging station can include a plurality of first pusher members configured to extend into the conveying path and movable for advancing the first document set along the conveying path. A plurality of movable pusher members are configured to extend into the conveying path downstream of the stop location and are movable for advancing a second document set positioned downstream.

According to other certain aspects of the present subject matter, a method for processing document sets in a sheet processing system is provided. The method can include feeding a first document set along a conveying path. At least one first pusher member can move in the conveying path upstream of the first document set. The first document set can be advanced with the at least one first pusher member. At least one movable pusher member can be raised into the conveying path downstream of the first document set in front of the first document set to advance a second document set.

According to other certain aspects of the present subject matter, an extended dump window for staging sheet articles within a sheet processing machine is provided. The extended dump window can include a conveying path with variable spacing (generally referred to as pitch) between pusher members for conveying a plurality of document sets from an upstream position to a downstream position. A sheet article assembly station with a feeder may be provided to dump sheet articles onto a staging area of the conveying path. At least one pusher member is movable from the conveying path within the staging area.

According to other further aspects of the present subject matter, a method for extending a dump window is provided. The method includes conveying variable pitch pusher members along a conveying path. At least one pusher member may be moved out of the conveying path at a staging area of the conveying path. A first document set can be dumped onto a staging area of the conveying path.

Figure 2:
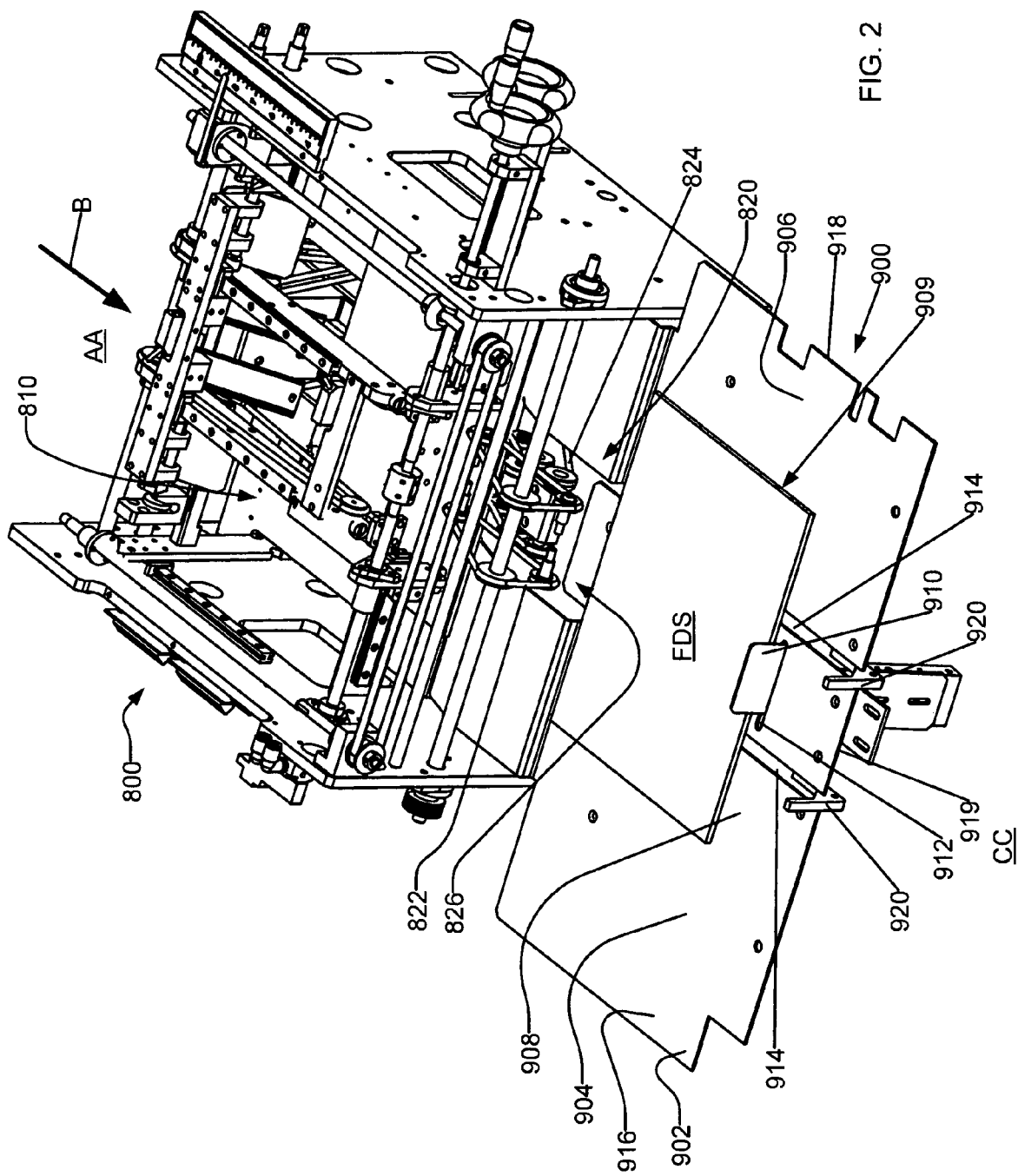
FIG. 2 illustrates a perspective view of an embodiment of a staging station according to the present subject matter.

FIG. 2 illustrates a perspective view of an assembly station 800 followed by a staging station, generally designated as 900. Sheet articles and/or mail articles flow from upstream within the sheet processing machine, such as an inserter system IS, in direction B into assembly station 800. The sheet articles being fed into assembly station 800 can be folded or unfolded depending on upstream processes as well as possibly some types of mail articles to be collected together to be inserted in envelopes downstream. Assembly station 800 can accumulate multiple sheet articles and/or mail articles to form first document sets. Assembly station 800 can include an accumulation deck, generally designated as 810, for accumulating multiple first document sets to be transferred out assembly station 800 downstream for later processing. Each document set of the multiple first document sets accumulated on the accumulation deck 810 can be fed out of the assembly station 800 individually. A document feeder 820 can grab each first document set within the assembly station 800 and feed that first document set onto a staging station, generally designated as 900.

As shown in FIG. 2, a first document set FDS can reside on staging station 900. The staging station can have a deck 902 defined therein or formed thereon or attached thereto. Staging deck 902 and accumulation deck 810 can help to form an upper surface 904 of elongated raceway conveyor 906. The staging deck 902 can define a staging area for first document sets FDS fed to the staging station 900 by the assembly station 800. Elongated raceway conveyor 906 is configured to advance a plurality of document sets consecutively along a substantially horizontal conveying path 908 from an upstream position AA to a downstream position CC.

As stated above, accumulation deck 810 of assembly station 800 can accumulate multiple sets of first document sets FDS. Document feeder 820 can feed each individual first document set FDS from accumulation deck 810 onto staging station 900 and conveying path 908. Document feeder 820 can include one or more top belts 822 and one or more bottom belts 824 that can propel each first document set FDS down the conveying path 908 at a feeding location 826. A stop gate 910 can be extended through an opening 912 in the staging deck 902 to stop the first document set FDS at a stop location 909 in the conveyor path 908. After first document set FDS is stopped at stop location 909, stop gate 910 can be lowered to allow first document set FDS to pass downstream. In some embodiments, friction between upper surface 904 of elongated raceway conveyor 906 and first document sets FDS may stop first document sets FDS in stop location 909.

Staging deck 902 can also include elongated slots 914 that run along the direction B of the flow of documents sets on conveyor 906. Staging deck 902 can be made of a first outer platform 916 and a second outer platform 918 with a middle platform 919 disposed therebetween. The first, second and middle platforms 916, 918, 919 can be spaced apart to form a pair of the elongated slots 914 within staging deck 902. Elongated slots 914 can run substantially parallel to each other. These elongated slots 914 can continue through the sheet processing machine to permit a plurality of first pusher members 920 and a plurality of movable pusher members to extend through the elongated slot 914 to push document sets along conveying path 908.

Figure 3:
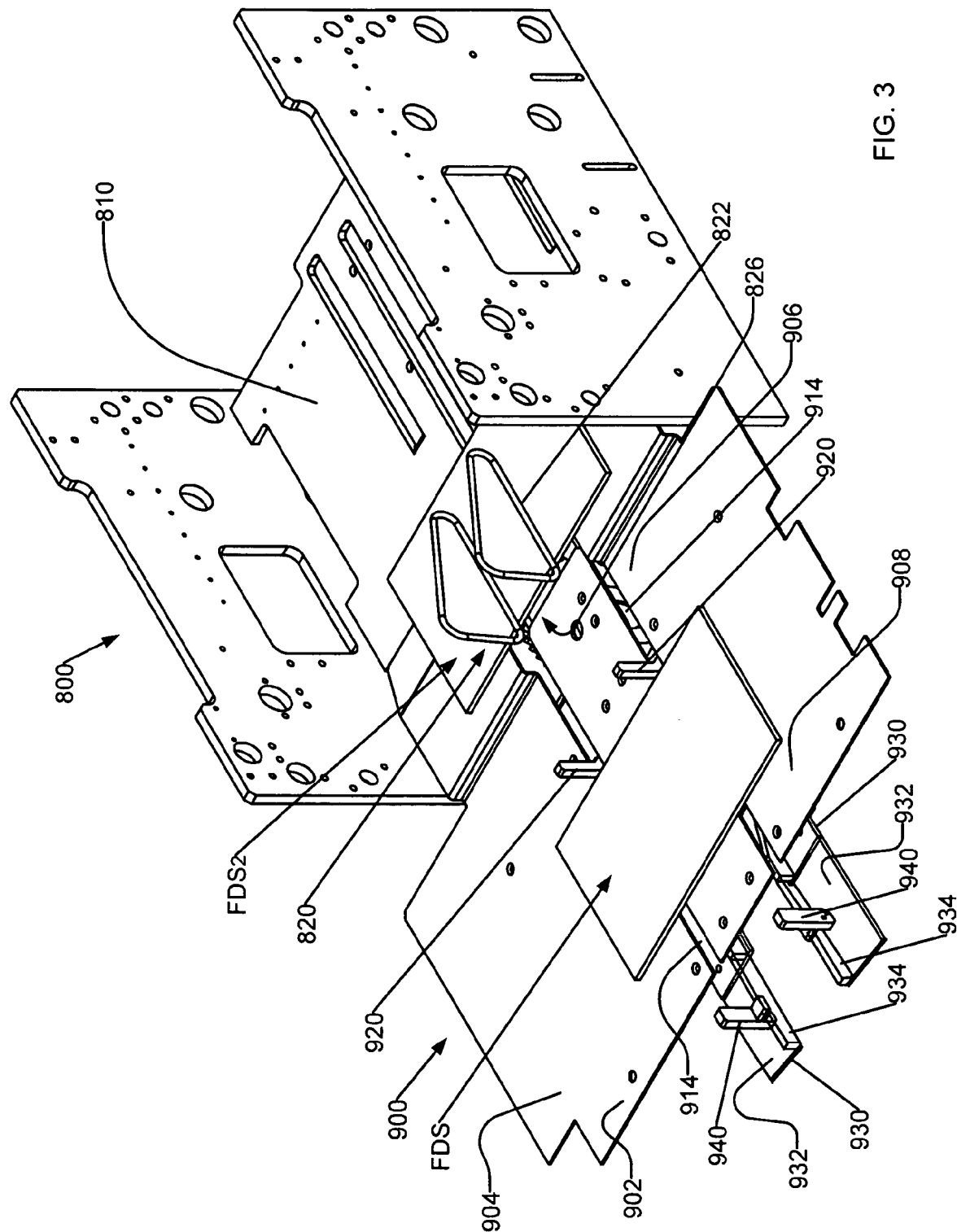
FIG. 3 illustrates a perspective view of the staging station according to FIG. 2.

FIG. 3 shows selective portions of assembly station 800 and staging station 900 to better illustrate steps in the staging process. After stop gate 910 has been lowered, first document set FDS can be pushed along conveying path 908 by a pair of first pusher members 920 that travel along conveying path 908 and ride along pusher member tracks 930. As first document set FDS is being transported along the conveying path 908 by first pusher members 920, another first document set $FDS_2$ can be in the process of being prepared to be fed by document feeder 820 onto conveying path 908. Once first pusher members 920 pass a specified point along conveying path 908, the document feeder 820 can feed the other first document set $FDS_2$ onto the staging deck 902 as discussed in more detail below.

In FIG. 3, the upper surface 904 of conveyor 906 past staging deck 902 is not shown to permit viewing of a portion of pusher member tracks 930. The first pusher members 920 can extend through elongated slots 914 within staging deck 902. A pair of movable pusher members 940 can travel along raceway conveyor 906 and extend through elongated slots 914 in front of the pair of first pusher members 920. Movable pusher members 940 can be used to advance a second document set which is accumulated downstream. For example, movable pusher members 940 can be used to advance enclosures fed from enclosure feeders in front of movable pusher members 940. First pusher members 920 and movable pusher members 940 can be movably mounted to a portion of the conveyor 906 as will be explained in more detail below. First pusher members 920 may be different heights than movable pusher members 940. For example, first pusher members 920 may be taller than movable pusher members 940.

Each pusher member track 930 can include a first section 932 and a second section 934. First pusher members 920 ride along first section 932 of each pusher member track 930 causing first pusher members 920 to extend through elongated slots 914 into conveying path 908. Second section 934 of each pusher member track 930 can be used to extend movable pusher members 940 through elongated slot 914 and into conveying path 908. The process of extending both first pusher members 920 and movable pusher members 940 is discussed in more detail below.

Figure 4:
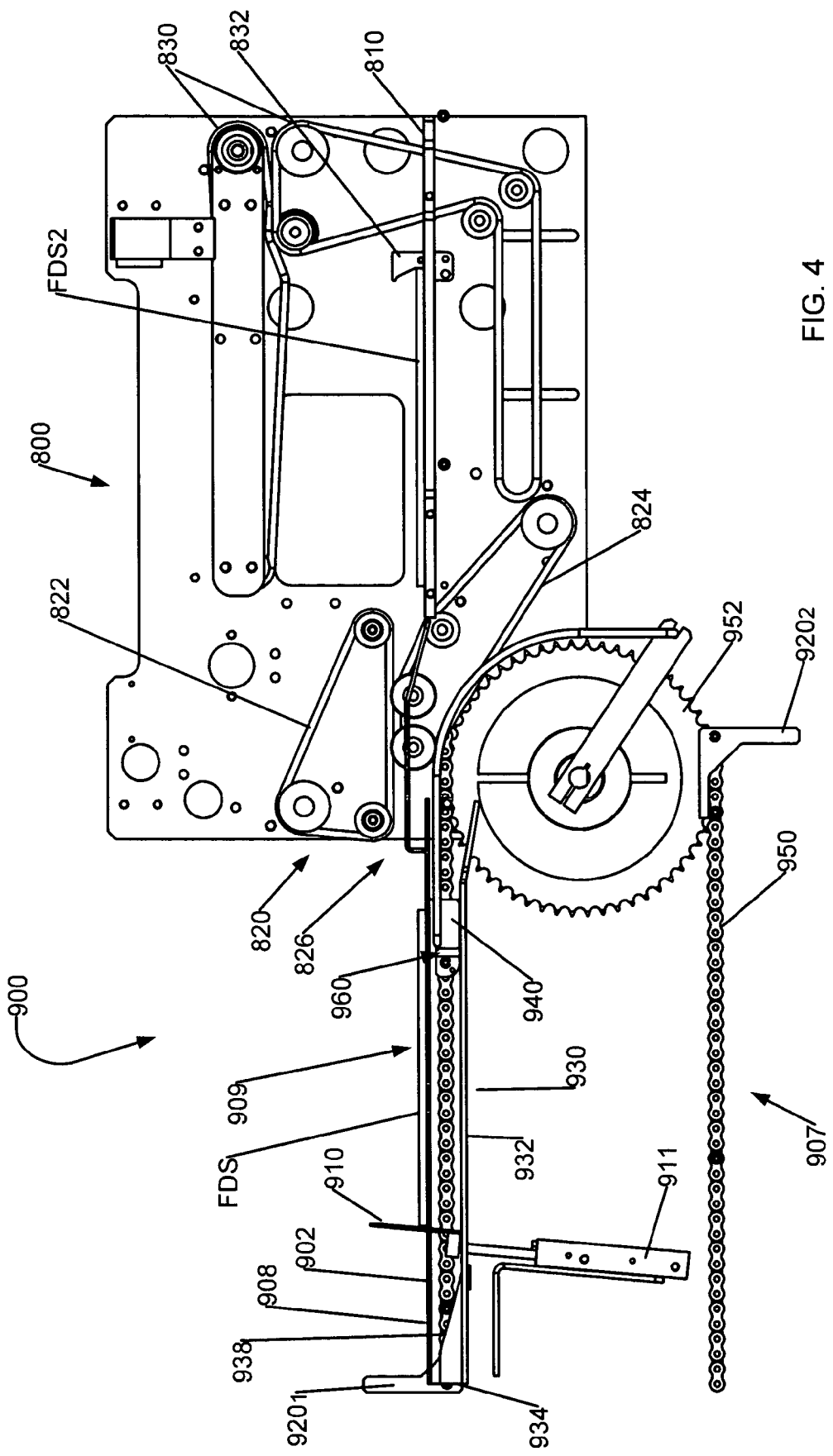
FIG. 4 illustrates a cross-sectional side view of portions of embodiments of a staging station and an assembly station during processing of sheet articles according to the present subject matter.
Figure 5:
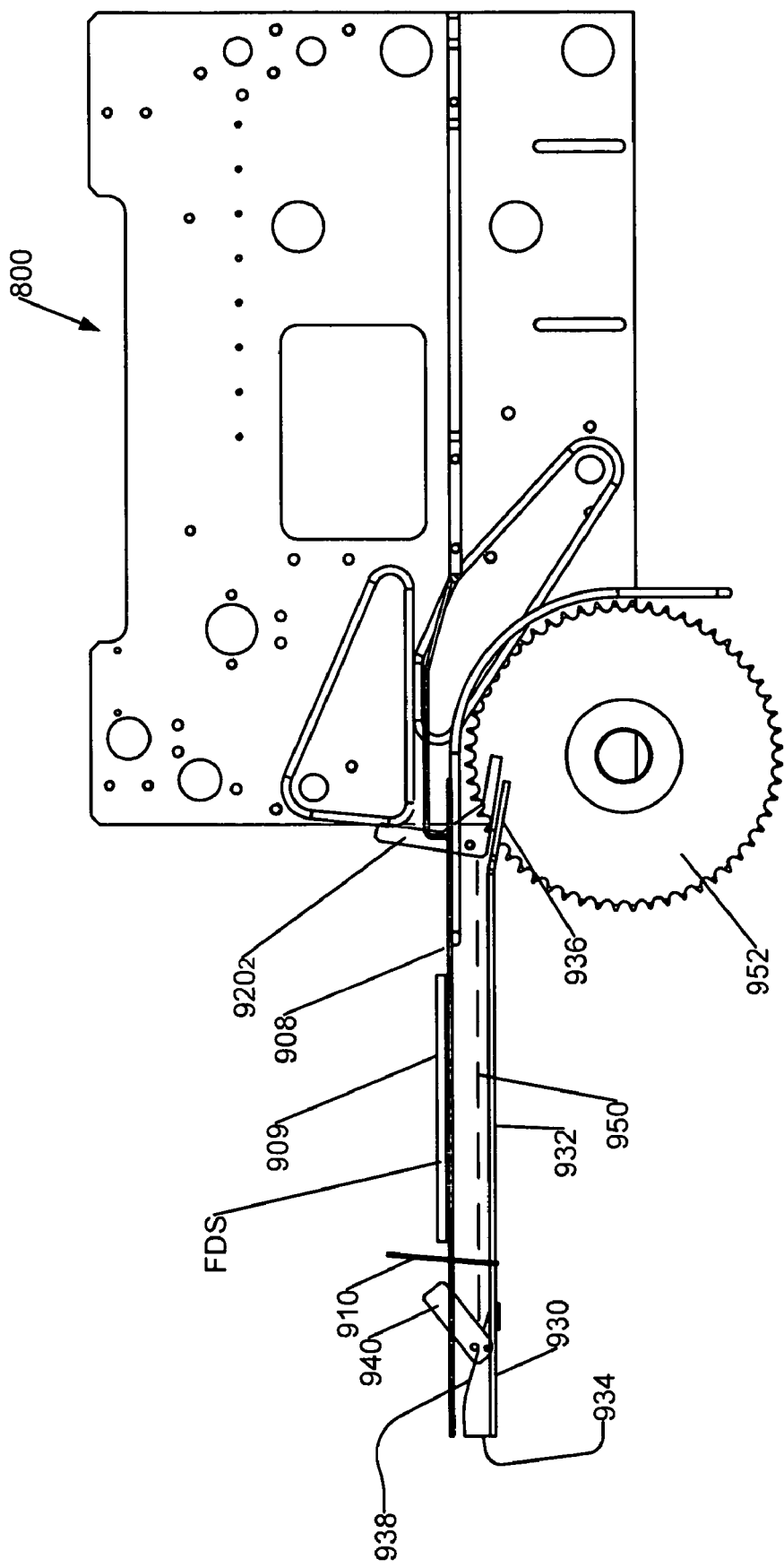
FIG. 5 illustrates a cross-sectional side view of portions of embodiments of a staging station and an assembly station during processing of sheet articles according to the present subject matter.
Figure 6:
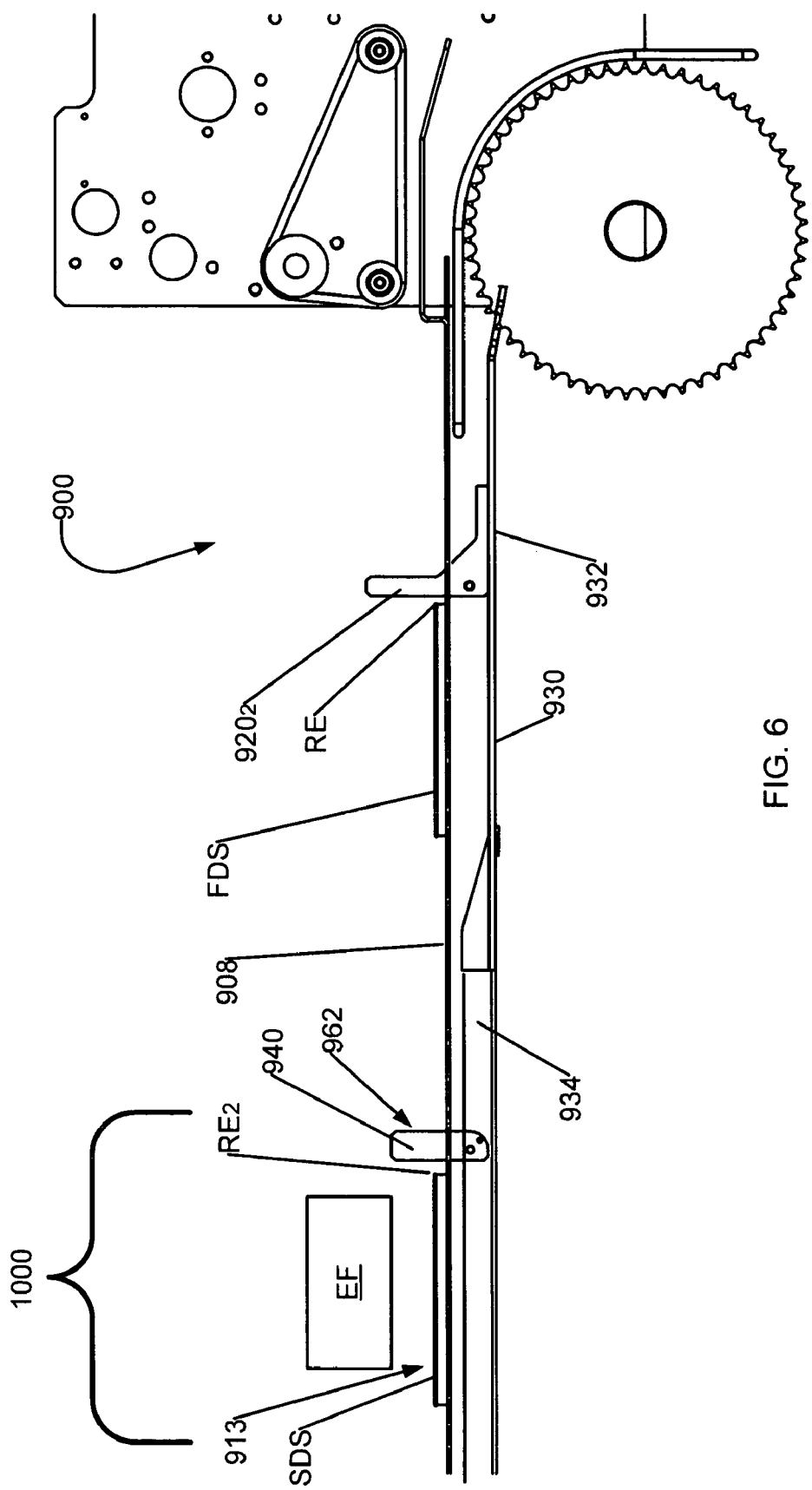
FIG. 6 illustrates a cross-sectional side view of portions of embodiments of a staging station and assembly station during processing of sheet articles according to the present subject matter.

FIGS. 4, 5 and 6 illustrate cross-sectional side views of portions of staging station 900 and assembly station 800 as different first document sets are being staged within staging station 900 and being transported out of staging station 900 for further processing downstream. Only one pusher member track and associated chain and pusher members are shown and described. It is understood that other pusher member tracks and their associated conveyor parts can be present. For example, for FIGS. 4, 5 and 6, a parallel pusher member track and associated chain and pusher members can run in parallel to the described chain and pusher members to aid in transporting first and second document sets.

As shown in FIG. 4, raceway conveyor 906 can include at least one movable conveyor device, generally designated as 907, such as a belt, a chain or the like. For example, the conveyor device may be chain 950 to which first pusher members 920 and movable pusher members 940 can be attached. For example, in the embodiments shown in the Figures, two chains 950 can be used to rotate first pusher members 920 and movable pusher members 940 in pairs to push the document sets along conveying path 908. As seen in FIG. 4, chain 950 can be driven by a motor (not shown) and ride around a sprocket 952 beneath staging station 900 and assembly station 800. First pusher members 920 and movable pusher members 940 alternate along chain 950 so that each first document set is followed by a second document or vice versa. As chain 950 travels around sprocket 952, first section 932 of the respective pusher member track 930 extends each first pusher member 920 into conveying path 908 before feeding location 826 of document feeder 822. First pusher members 920 can be considered fixed-positioned pusher members. Movable pusher members 940 can be pivotable and remain in a lowered position beneath conveying path 908 until encountering second section 934 of the respective pusher member track 930, which will extend the movable pusher members 940 into the conveying path 908. In this manner, movable pusher members 940 that are to push second document sets do not interfere with the feeding of the first document sets into the conveying path.

As seen in FIG. 4, first pusher member $920_1$ can be advancing one first document set (not shown), while first document set FDS is fed on staging deck 902 of staging station 900 and stopped on conveying path 908 by stop gate 910 at stop location 909. While first document set FDS is being fed and stopped on conveying path 908, movable pusher member 940 passes beneath first document set FDS in a lowered position. Stop gate 910 can be extended into and retracted out of the conveying path 908 by an actuator 911. First document set FDS stays at stop location 909 on staging deck 902 until first pusher member $920_2$ rotates around sprocket 952 and is extended into conveying path 908 by first section 932 to push first document set FDS along conveying path 908. First document set $FDS_2$ is fed into the assembly station 800 by feeding belts 830 and resides on accumulation deck 810 ready to be pushed toward top belts 822 and bottom belts 824 of document feeder 820 by eject pin 832.

First section 932 of each pusher member track 930 can have a chamfered lead end 936 that aids in extending first pusher members 920 into conveying path 908 as chain 950 rides around sprocket 952. As seen in FIG. 5, first pusher member $920_2$ extends into conveying path upstream of first document set FDS, while movable pusher member 940 can be extended into conveying path 908 downstream of stop location 909 of first document set FDS and stop gate 910 by second section 934 of pusher member track 930. A portion of movable pusher member 940 can contact ramp 938 of second section 934 to begin raising movable pusher member 940 into conveying path 908.

As seen in FIG. 6, stop gate 910 is lowered beneath conveying path 908 and first pusher member $920_2$, which rides along first section 932 of pusher member track 930, begins pushing first document set FDS along conveying path 908 in staging station 900. First pusher member $920_2$ also registers the sheet articles within first document set FDS on a rear end RE of first document set FDS. At this time, movable pusher member 940 rides along second section 934 of pusher member track 930 in conveying path 908 ready to pick up second document set SDS. Second document set SDS can comprise one or more sheet articles and/or one or more mail articles fed onto the conveying path 908 by one or more enclosure feeders EF (see FIG. 1) at a second document feed location 913 in front of movable pusher member 940. Movable pusher members 940 can also register second document set SDS at a rear end $RE_2$. The first document set pushed along conveying path 908 by first pusher member $920_2$ and second document set pushed along conveying path 908 by movable pusher member 940 can be collated together downstream in collating apparatus module 2000 shown in the schematic in FIG. 1 and described in U.S. patent application Ser. No. 11/240,604.

Once first pusher member $920_2$ advances first document set FDS past stop gate 910, eject pin 832 can push first document set $FDS_2$ as seen in FIG. 4 into document feeder 820 to feed first document set $FDS_2$ onto staging deck 902. Stop gate 910 can then extend to stop first document set $FDS_2$ at stop location 909 on staging deck 902 for another first pusher member 920 to engage first document set $FDS_2$.

Figure 7:
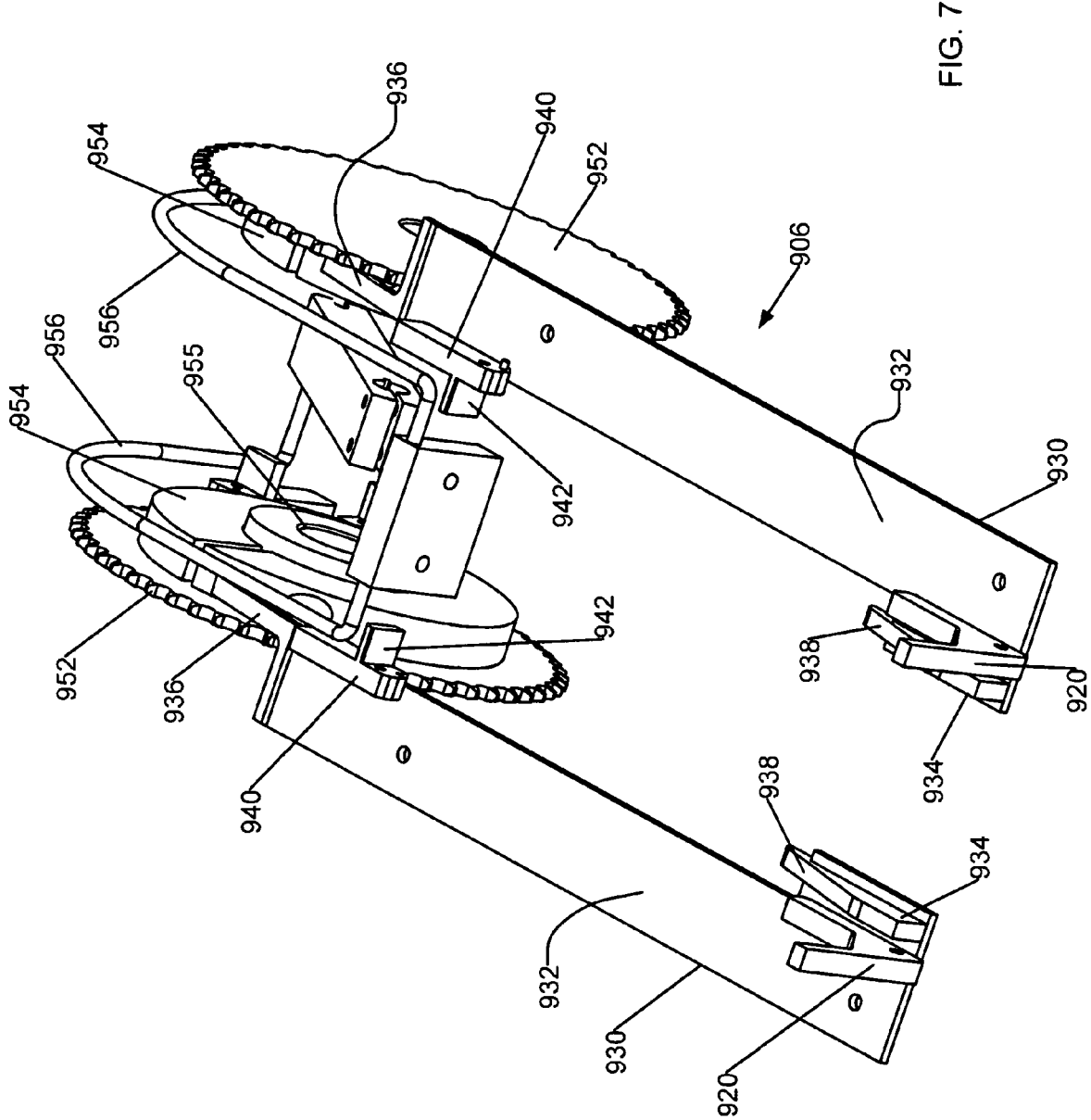
FIG. 7 illustrates a perspective view of a portion of an embodiment of a raceway conveyor according to FIG. 2.
Figure 8:
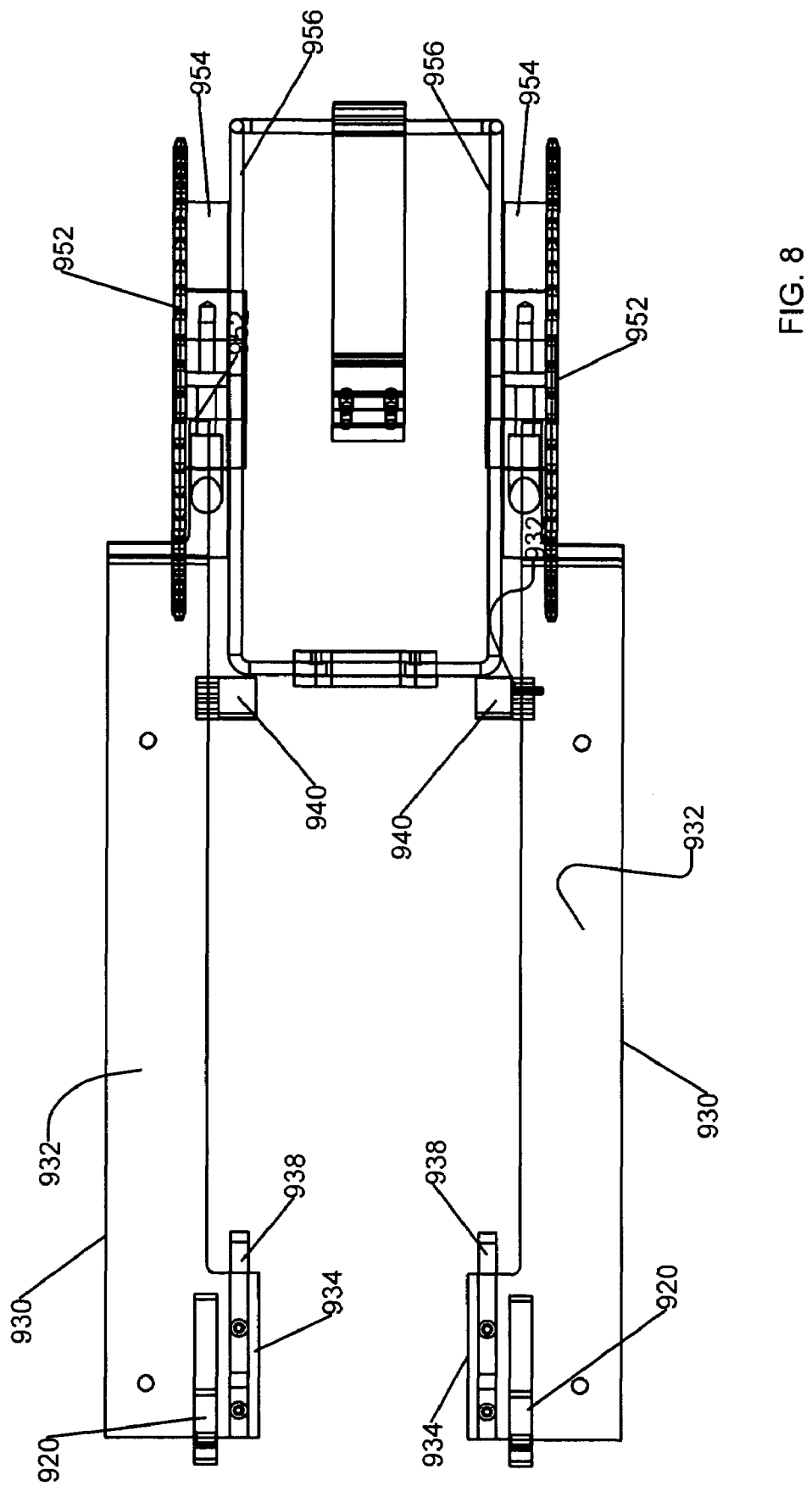
FIG. 8 illustrates top plan view of a portion of the raceway conveyor according to FIG. 7.

FIGS. 7 and 8 show portions of raceway conveyor 906 that can be used in extending first pusher members and movable pusher members into the conveying path. Two parallel pusher member tracks 930 can be aligned underneath two parallel elongated slots 914 within conveying path 908 (shown in FIGS. 2 and 3). Two sprockets 952 used to rotate chains (not shown for the sake of clarity) of raceway conveyor 906 are aligned with pusher member tracks 930. A shelf 954 is secured around a hub 955 of each sprocket 952. Shelves 954 provide a surface on which first pusher members 920 ride as first pusher members 920 and movable pusher members 940 rotate around sprockets 952. A wire guide 956 can be placed in close proximity of each sprocket 952 to keep movable pusher members 940 in a lowered position as they rotate with chain 950 around sprocket 952. The wire guides 956 can be a single unit or can be separate wire guides that are individually placed around each shelf 954 of sprockets 952.

Pusher member tracks 930 each can have first section 932 and second section 934. First sections 932 each can have a chamfered lead end 936 that can extend in close proximity of a corresponding shelf 954. As first pusher members 920 and movable pusher members 940 ride around shelves 954 and wire guide 956, respectively, they are guided onto pusher member tracks 930 by lead ends 936 of first sections 932. As first pusher members 920 ride around on shelves 954 onto lead ends 936 of first sections 932 of pusher member tracks 930, first pusher members 920 will extend in conveying path 908 shown in FIGS. 2 and 3. As movable pusher members 940 ride against wire guides 956, wire guides 956 can direct movable pusher members 940 into a lowered position as they are passed onto first sections 932 of pusher member tracks 930. Movable pusher members 940 reside in their lowered position until arms 942 of movable pusher members 940 contact ramps 938 of second sections 934 of pusher member tracks 930. Ramps 938 raise movable pusher members 940 into an upright position so that they extend into path 908 shown in FIGS. 2 and 3.

Figure 9A:
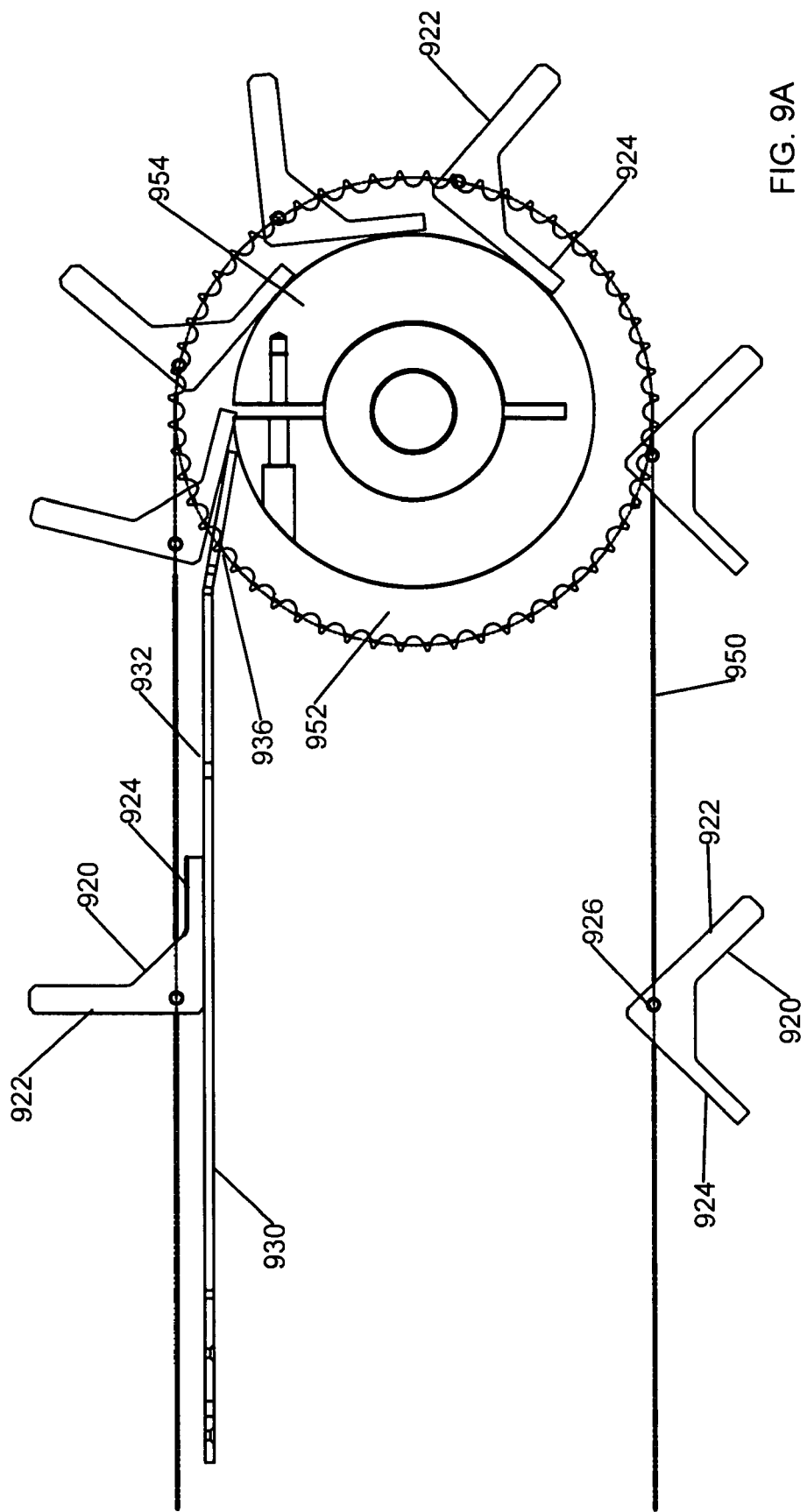
FIG. 9A illustrates a schematic side view of a progression of a first pusher member according to the present subject matter.

FIG. 9A shows a progression of a single first pusher member 920 as chain 950 to which it is attached (represented by a single line) transports first pusher member 920 around sprocket 952 and pusher member track 930. First pusher member 920 includes guide post 922 and a base 924. Guide post 922 can extend about perpendicular to base 924. First pusher member 920 can be attached to chain 950 by an attachment pin 926 positioned proximal to the convergence of guide post 922 and base 924. First pusher member 920 can be attached to chain 950 to allow first pusher member 920 to rotate about attachment pin 926. The weight distribution of first pusher member 920 can be such that base 924 at least partially faces an interior of chain 950 that engages sprocket 952.

As chain 950 rotates about sprocket 952, base 924 of first pusher member 920 contacts shelf 954 of sprocket 952. Base 924 of first pusher member 920 rides on shelf 954 as the chain rotates about sprocket 952 holding guide post 922 of first pusher member 920 in an extended position outward from chain 950. Shelf 954 guides base 924 onto chamfered lead end 936 of first section 932 of pusher member track 930. Lead end 936 guides first pusher member 920 onto first section 932 of pusher member track 930. With base 924 residing firmly against first section 932, guide post 922 of first pusher member 920 extends into the conveying path to push a document set along the conveying path.

Figure 9B:
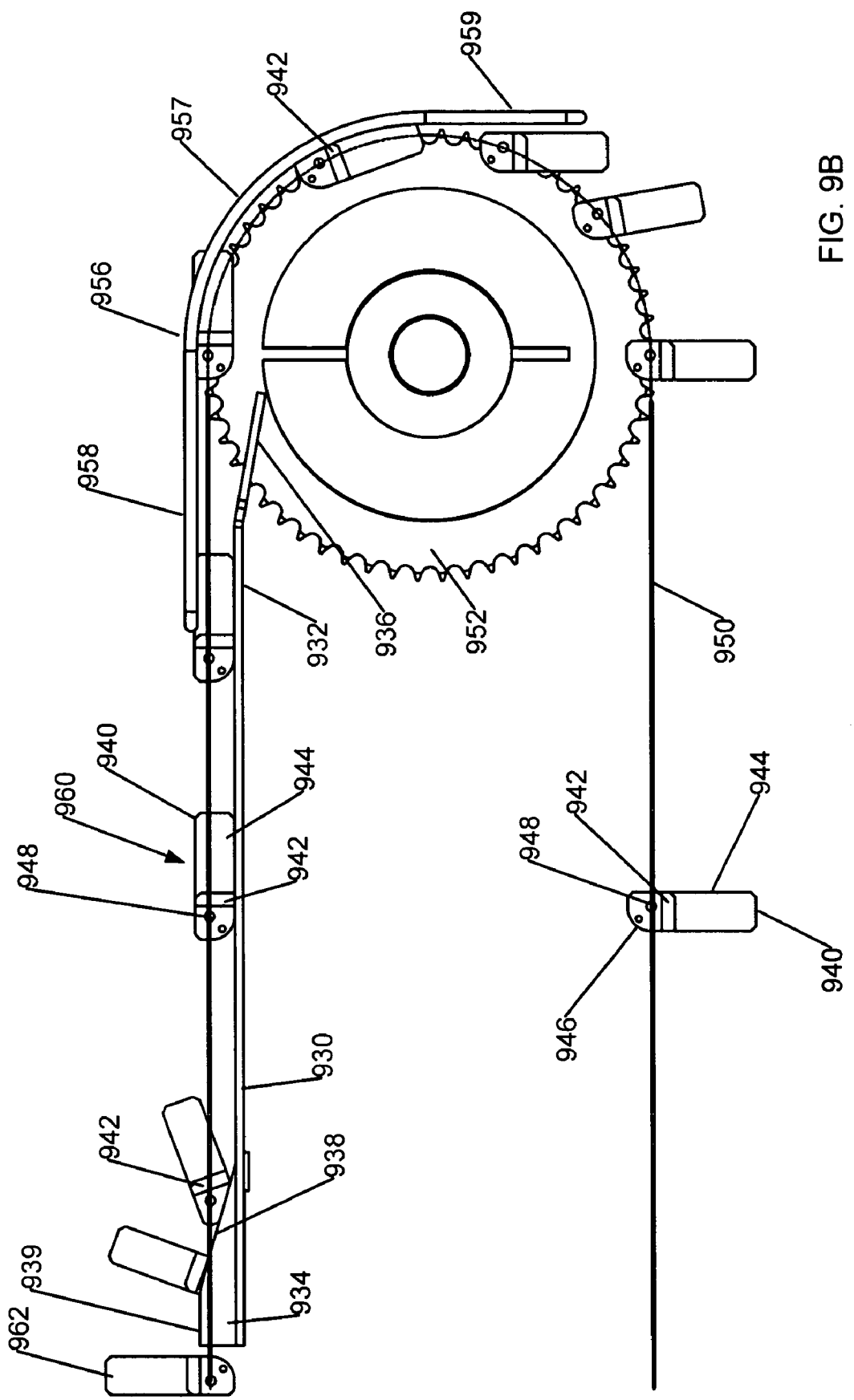
FIG. 9B illustrates a schematic side view of a progression of a movable pusher member according to the present subject matter.

Similarly, FIG. 9B shows a progression of a single movable pusher member 940 as chain 950 to which it is attached (represented by a single line) transports movable pusher member 940 around sprocket 952 and pusher member track 930. Movable pusher member 940 can include an elongated post body 944 with an arm 942 that extends perpendicularly outward from post body 944 and chain 950. Movable pusher member 940 can also include a rounded foot 946. Movable pusher member 940 can be attached to chain 950 by an attachment pin 948 between rounded foot 946 and arm 942. Movable pusher member 940 can be attached to chain 950 to allow movable pusher member 940 to rotate about attachment pin 948.

Wire guide 956 can extend around sprocket 952 in proximity to sprocket 952. Wire guide 956 has a curved section 957 that has a curvature that is similar to the radius of curvature of sprocket 952. A first straight section 958 of wire guide 956 can extend generally tangentially from curved section 957 above a portion of first section 932 of pusher member track 930 near lead end 936. Further, a second straight section 959 of wire guide 956 can extend generally tangentially from curved section 957 on its other end. As chain 950 rotates around sprocket 952, arm 942 of movable pusher member 940 can contact second straight section 959 of wire guide 956 as sprocket 952 guides the arm 942 of movable pusher member 940 into curved section 957. Wire guide 956 prevents post body 944 from assuming an upright position that extends outward from chain 950. By contacting arm 942, wire guide 956 holds movable pusher member 940 in a lowered position relative to chain 950. As chain 950 rotates about sprocket 952, straight section 958 of wire guide 956 guides movable pusher member 940 onto first section 932 of pusher member track 930 with movable pusher member 940 in a lowered position, generally designated as 960. With movable pusher member 940 in lowered position 960, post body 944 rides along first section 932 of pusher member track 930 with arm 942 extending outward from post body 944 and perpendicular to first section 932 of pusher member track 930.

Second section 934 of pusher member track 930 extends into the path of arm 942 as movable pusher member 940 and chain 950 travel forward. As chain 950 is rotated forward, arm 942 contacts ramp 938 of second section 934 causing movable pusher member 940 to rotate upward about attachment pin 948. Once ramp 938 levels off and arm 942 of movable pusher member 940 rides along top surface 939 of second section 934 of pusher member track 930, movable pusher member 940 assumes an upright position, generally designated as 962, with post body 944 of movable pusher member 940 extending into the conveying path of the sheet processing machine. When movable pusher member 940 is in upright position 962, movable pusher member 940 is ready to push a second document set along the conveying path.

It can be understood that the feature of an extended dump window can result from the combined operation of assembly station 800 and staging station 900 as shown in FIGS. 4, 6 and 10A. By having movable pusher members 940 assuming a lowered position 960 in staging station 900 as seen in FIG. 4, the distance between pusher members extending into conveying path 908 within staging station 900 is increased. As described above, first pusher members 920 and movable pusher members 940 can alternate such that between any pair of first pusher members 920, a movable pusher member 940 can reside, as seen in FIG. 10A. Further, in other embodiments, multiple movable pusher members 940 can reside between any two consecutive first pusher members 920 as shown in FIG. 10B. FIG. 10A illustrates the spacing of first pusher members 920 and movable pusher members 940 on one embodiment of chain 950 in which first pusher members 920 and movable pusher members 940 alternate. First pusher members 920 and movable pusher members 940 can be spaced equally apart from each other along chain 950 at distances $D_2$ and $D_3$ as measured from a pushing face PF of each pusher member 920, 940. However, the distances $D_2$ and $D_3$ are not required to be equal. First pusher members 920 are spaced along chain 950 at a distance $D_1$. Since alternating first pusher members 920 and movable pusher members 940 are spaced equally along chain 950, the distance $D_1$ between first pusher members 920 is equal to twice the distance $D_2$ between first pusher members 920 and movable pusher members 940. As a result of the movable pusher member, the spacing between or effective pitch of the pusher members on the conveying path can be changed by having the movable pusher member 940 in either the up or lower position. When a movable pusher member 940 is in the down position, the pitch or spacing between members is doubled since the pitch becomes the distance between two first pusher members 920.

The extended dump window can result from first document set FDS being dumped from the assembly station 800 to the staging station 900 between two consecutive first pusher members without interference from a movable pusher member disposed therebetween. Small documents can be ready to dump from the assembly station 800 using document feeder 820, as soon as the first pusher member 920 passes a minimal staging area, which is approximately equal to the document set width, i.e. the distance that the document set will occupy along the collation track. A major throughput gain for a sheet processing machine can occur when the next document set is large and additional assembly time is required. The extended dump window provides the needed time for the larger document to be assembled and dumped without missing a cycle of pusher members. Optionally, stop gate 910 may be used to control the dumping of large documents. Note that the movable pusher member 940 is in the lowered position 960 (see FIG. 4), allowing the document set FDS to rest above the movable pusher member 940. If movable pusher member 940 was fixed in the upright position at the feeding location 826 (see FIG. 2) and there was a delay in feeding first document set FDS, first document set FDS would land on top of movable pusher member 940, resulting in a jam.

By having movable pusher members 940 pivotable from the lowered position 960 to the upright position 962, the dump window is increased (see FIGS. 4 and 6). Without the feature of movable pusher members being movable out of the conveying path, the first document sets would have to be dumped upstream of the movable push members which would have the effect of reducing the dump window by the distance between the movable pusher members and the first pusher members directly upstream of the pusher members. As seen in FIGS. 4 and 6, when the chain 950 is advanced, the first pusher member $920_2$ will advance to contact the document set FDS and the movable pusher member 940 will advance to the ramp 938 and be set to the upright position 962. Once movable pusher member 940 is in upright position 962, enclosure feeders 1000 can be used to add the second document set SDS to the conveying path 908.

In the embodiment shown in FIG. 10A, the distance into which to feed the first document sets onto the staging area, i.e. the stop location, of the conveying path from the document feeder is distance D1 between the consecutive first pusher members $920_1$, $920_2$, instead of merely the distance D3 between the first pusher member $920_1$ and the leading movable pusher member 940. The distance in which to feed first document sets on conveying path 908 (see FIG. 4) is increased by the distance $D_2$ by holding movable pusher members 940 in a lowered position beneath the conveying path until after the stop location for first document sets. The effective distance in which to feed first document sets is then equal to the distance D1 between pusher members $920_1$, $920_2$, extending into the conveying path of a sheet processing machine. If both first pusher members and movable pusher members were raised before the stop location of the first document set on staging deck 902, then the distance in which to feed first document sets would only be distance D3. Thereby, the timing for feeding first document sets would need to be more accurate and the window of time in which to feed first document sets would be shortened when running at comparable speeds.

Since movable pusher members 940 are not extended into the conveying path until after the stop location where first document sets come to reside on conveying path 908 (see FIG. 4) after being fed onto staging deck 902 by document feeder 820, the distance and therefore the timing into which to feed the first document sets are increased. This increased window can thus increase efficiency of the sheet processing machine by increases the flexibility of the timing for feeding first document sets into the conveying path.

As illustrated in FIG. 10B, multiple movable pusher members 940 may be positioned along chain 950 between consecutive first pusher members 920. In the embodiment shown, consecutive first pusher members $920_1$, $920_2$, can be spaced along chain 950 at a distance D4 as measured from a pushing face PF of each pusher member $920_1$, $920_2$. A first movable pusher member 940, can be spaced from the first pusher member $920_1$ at a distance D5 as measured from pushing face PF of each pusher member $920_1$, $940_1$. A second movable pusher member $940_2$ can be spaced from the first movable pusher member $940_1$ at a distance D6 as measured from a pushing face PF of each pusher member $940_1$, $940_2$. Further, second movable pusher member 9402 is spaced from the second first pusher member $920_2$ at a distance D7 as measured from pushing face PF of each pusher member $940_2$, $920_2$. The additional pusher members allow additional document sets XDS to be added to the conveying path for later assembly into insert material. By having the first movable pusher member $940_1$ being pivotable, the distance into which to feed the first document set FDS is increased from distance D5 to distance D5 plus distance D6. If both the first and second movable pusher members $940_1$, $940_2$ are pivotable, the distance into which to feed the first document set FDS is increased from the distance D5 to the distance D4. Thereby, the dump window can be greatly increased.

The embodiments of the present disclosure shown in the drawings and described above are exemplary of numerous embodiments that can be made within the scope of the appending claims. It is contemplated that the configurations for staging document sets within a sheet processing machine can comprise numerous configurations other than those specifically disclosed. The scope of a patent issuing from this disclosure will be defined by the appended claims.

What is claimed is:

1. An extended dump window for staging sheet articles within a sheet processing machine, the extended dump window comprising:
   (a) a conveying path for conveying document sets from an upstream position to a downstream position by a plurality of pusher members traveling along the conveying path;
   (b) the conveying path having a staging area for receiving a document set and
   (c) the pusher members including at least one pusher member configured to be extended into the conveying path and maintained in a fixed position throughout movement along the conveying path along which the plurality of pusher members travel, and at least one pusher member being movable from the conveying path at the staging area.

2. The extended dump window according to claim 1, wherein the pusher members that are movable from the conveying path at the staging area are pivotable to a position below the conveying path.

3. The extended dump window according to claim 1, comprising:
   (a) a document feeder configured to feed a first document set to the conveying path at a feed location;
   (b) a stop location located along the conveying path downstream from the feed location;
   (c) the at least one pusher member configured to be extended into the conveying path and maintained in a fixed position throughout movement along the conveying path along which the plurality of pusher members travel comprising a plurality of first pusher members configured to extend into the conveying path and movable for advancing the first document set along the conveying path; and
   (d) the at least one pusher member being movable from the conveying path at the staging area comprising a plurality of movable pusher members configured to extend into the conveying path downstream of the stop location and movable for advancing a second document set positioned downstream 4. The extended dump window according to claim 3, further comprising at least one pusher member track having a first section and a second section positioned proximal to the conveying path, the first section of the pusher member track configured to extend the first pusher members into the conveying path upstream of the stop location of the first document set to advance the first document set, and the second section of the pusher member track configured to pivot the movable pusher members into the conveying path downstream of the stop location of the first document set.

5. The extended dump window according to claim 4, wherein two pusher member tracks extend in parallel beneath the conveying path, the two pusher member tracks configured to extend two sets of first and movable pusher members into the conveying path in parallel.

6. The extended dump window according to claim 3, further comprising a guide positioned proximal to the document feeder, the guide configured to position the movable pusher members in a lowered position.

7. The extended dump window according to claim 3, further comprising a raceway conveyor to which the first and movable pusher members are movably attached.

8. The extended dump window according to claim 7, wherein the raceway conveyor comprises at least one movable conveyor device on which the first and movable pusher members are attached.

9. The extended dump window according to claim 8, wherein the at least one conveyor device comprises at least one chain.

10. The extended dump window according to claim 9, further comprising a shelf disposed around a hub of a sprocket, which the chain engages, the shelf configured to aid the extending of the first pusher members into the conveying path.

11. The extended dump window according to claim 3, further comprising a second document feed location at which a second document set can be fed along a conveying path in front of the extended movable pusher members.

12. A method for extending a dump window, the method comprising:
   (a) conveying a plurality of pusher members along a conveying path;
   (b) moving at least one pusher member out of the conveying path at a staging area of the conveying path and maintaining a pusher member that follows the at least one pusher member that is moved out of the conveying path at the staging area in an extended fixed-position along the conveying path which the plurality of pusher members travel; and
   (c) dumping a first document set to a staging area of the conveying path as the at least one pusher member that is moved out of the conveying passes the staging area.

13. The method according to claim 12, wherein step (a) of moving at least one pusher member out of the conveying path comprises pivoting the at least one pusher member to a position below the conveying path.

14. An extended dump window for staging sheet articles within a sheet processing machine, the extended dump window comprising:
   (a) a conveying path with variable pitch pusher members for conveying document sets from an upstream position to a downstream position;
   (b) the conveying path having a staging area for receiving a document set;
   (c) a document feeder configured to feed a first document set to the conveying path at a feed location;
   (d) a stop location located along the conveying path downstream from the feed location;
   (e) the variable pitch pusher members including a plurality of first pusher members configured to extend into the conveying path and movable for advancing the first document set along the conveying path;
   (f) the variable pitch pusher members including a plurality of movable pusher members configured to be movable from the conveying path at the staging area and to extend into the conveying path downstream of the stop location and movable for advancing a second document set positioned downstream; and
   (g) a stop gate movably positioned along the conveying path downstream of the document feeder and extendable into the conveying path at the stop location to stop a first document set fed into the conveying path by the document feeder, and the stop gate being retractable from the conveying path to allow passage of a first document set fed into the conveying path by the document feeder.

15. An extended dump window for staging sheet articles within a sheet processing machine, the extended dump window comprising:
   (a) a conveying path with variable pitch pusher members for conveying document sets from an upstream position to a downstream position;
   (b) the conveying path having a staging area for receiving a document set;
   (c) a document feeder configured to feed a first document set to the conveying path at a feed location;
   (d) a stop location located along the conveying path downstream from the feed location;
   (e) the variable pitch pusher members including a plurality of first pusher members configured to extend into the conveying path and movable for advancing the first document set along the conveying path;
   (f) the variable pitch pusher members including a plurality of movable pusher members configured to be movable from the conveying path at the staging area and to extend into the conveying path downstream of the stop location and movable for advancing a second document set positioned downstream;
   (g) at least one pusher member track having a first section and a second section positioned proximal to the conveying path, the first section of the pusher member track configured to extend the first pusher members into the conveying path upstream of the stop location of the first document set to advance the first document set, and the second section of the pusher member track configured to pivot the movable pusher members into the conveying path downstream of the stop location of the first document set; and
   (h) the first section of the pusher member track comprising a chamfered lead end.

16. An extended dump window for staging sheet articles within a sheet processing machine, the extended dump window comprising:
   (a) a conveying path with pusher members for conveying document sets from an upstream position to a downstream position;
   (b) the conveying path having a staging area for receiving a document set;
   (c) a document feeder configured to feed a first document set to the conveying path at a feed location;
   (d) a stop location located alone the conveying path downstream from the feed location;
   (e) the pusher members including a plurality of first pusher members configured to extend into the conveying path and movable for advancing the first document set alone the conveying path;
   (f) the pusher members including a plurality of movable pusher members configured to be movable from the conveying path at the staging area and to extend into the conveying path downstream of the stop location and movable for advancing a second document set positioned downstream;
   (g) at least one pusher member track having a first section and a second section positioned proximal to the conveying path, the first section of the pusher member track configured to extend the first pusher members into the conveying path upstream of the stop location of the first document set to advance the first document set, and the second section of the pusher member track configured to pivot the movable pusher members into the conveying path downstream of the stop location of the first document set; and
   (h) the first section of the pusher member track comprising a ramp configured to raise the movable pusher members from a lowered position to an upright position.

17. The extended dump window according to claim 16, wherein the movable pusher members comprise an arm that contacts the ramp.

18. An extended dump window for staging sheet articles within a sheet processing machine, the extended dump window comprising:
  (a) a conveying path with variable pitch pusher members for conveying document sets from an upstream position to a downstream position;
  (b) the conveying path having a staging area for receiving a document set;
  (c) a document feeder configured to feed a first document set to the conveying path at a feed location;
  (d) a stop location located along the conveying path downstream from the feed location;
  (e) the variable pitch pusher members including a plurality of first pusher members configured to extend into the conveying path and movable for advancing the first document set along the conveying path;
  (f) the variable pitch pusher members including a plurality of movable pusher members configured to be movable from the conveying path at the staging area and to extend into the conveying path downstream of the stop location and movable for advancing a second document set positioned downstream;
  (g) a raceway conveyor that includes a chain to which the first and movable pusher members are movably attached; and
  (h) a wire guide positioned proximal to and partially around a sprocket which the chain engages, the wire guide configured to position the movable pusher members in a lowered position.

19. An extended dump window for staging sheet articles within a sheet processing machine, the extended dump window comprising:
  (a) a conveying path with pusher members for conveying document sets from an upstream position to a downstream position;
  (b) the conveying path having a staging area for receiving a document set;
  (c) at least one pusher member being movable from the conveying path at the staging area; and
  (d) a stop gate movably positioned along the conveying path downstream of the document feeder and being extendable into the conveying path at the stop location to stop a first document set fed into the conveying path by the document feeder, and the stop gate being retractable from the conveying path to allow passage of a first document set fed into the conveying path by the document feeder.

\* \* \* \* \*

UNITED STATES PATENT AND TRADEMARK OFFICE
CERTIFICATE OF CORRECTION

| | |
|---|---|
| PATENT NO. | : 7,607,649 B2 |
| APPLICATION NO. | : 11/546554 |
| DATED | : October 27, 2009 |
| INVENTOR(S) | : Kapturowski et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 412 days.

Signed and Sealed this

Twelfth Day of October, 2010

David J. Kappos
*Director of the United States Patent and Trademark Office*